United States Patent [19]

McCullough et al.

[11] 3,708,254
[45] Jan. 2, 1973

[54] VERTICAL MOLD PRESS FOR MOLDING ARTICLES OF RUBBER-LIKE MATERIAL

[75] Inventors: Harry J. McCullough; John M. Shahid, both of Lexington; Aland Boyd, Clay City, all of Ky.

[73] Assignee: Parker Hannifin Corporation, Cleveland, Ohio

[22] Filed: May 10, 1971

[21] Appl. No.: 141,620

[52] U.S. Cl. .................... 425/235, 425/28, 425/383, 425/384, 425/395, 425/397
[51] Int. Cl. ........................................... B29f 5/00
[58] Field of Search ........ 425/28, 383, 384, 395, 397, 425/DIG. 42, DIG. 47

[56] References Cited

UNITED STATES PATENTS

| | | | |
|---|---|---|---|
| 2,354,241 | 7/1944 | Anderson | 425/235 |
| 2,646,595 | 7/1953 | Leistenswider | 425/DIG. 47 |
| 2,798,257 | 7/1957 | Beare | 425/DIG. 47 |
| 2,839,014 | 6/1958 | Fine | 425/383 X |
| 2,943,354 | 7/1960 | Gora | 425/DIG. 42 |
| 2,962,761 | 12/1960 | Hobson | 425/DIG. 47 |
| 2,976,575 | 3/1961 | Daubenberger | 425/DIG. 47 |
| 3,269,695 | 8/1966 | Grove | 425/DIG. 47 |
| 3,195,180 | 7/1969 | Jagger et al. | 425/DIG. 42 |
| 3,406,430 | 10/1968 | Furstenburg et al. | 425/DIG. 42 |

Primary Examiner—J. Howard Flint, Jr.
Attorney—Oberlin, Maky, Donnelly & Renner

[57] ABSTRACT

A press for molding articles such as O-rings of rubber-like material characterized in that a pair of vertically disposed mold plates secured to heating platens are relatively horizontally movable into and out of mating engagement, the press, when open, being unloaded by gravity upon movement of a stripper downwardly between said mold plates, and being loaded by lateral movement of a vertical loading device to position uncured stock between said mold plates so that when the press is closed the stock is squeezed into the cavities in the mating faces of said mold plates.

The press herein is further characterized in that when said mold plates are in mating engagement to cure the articles therein by heat and pressure the loading device may be withdrawn and moved to a horizontal position for loading of uncured stock thereon, the stock preferably being in the form of slit strips stretched over pins on the loading device.

Yet another characterizing feature of this invention is that novel lock means are provided to releasably lock one mold plate (or both) to the respective heating platen, said lock means including wedge blocks which are adapted to be struck by hammer blows to lock or unlock the mold plate to or from the respective heating platen.

14 Claims, 6 Drawing Figures

PATENTED JAN 2 1973
3,708,254
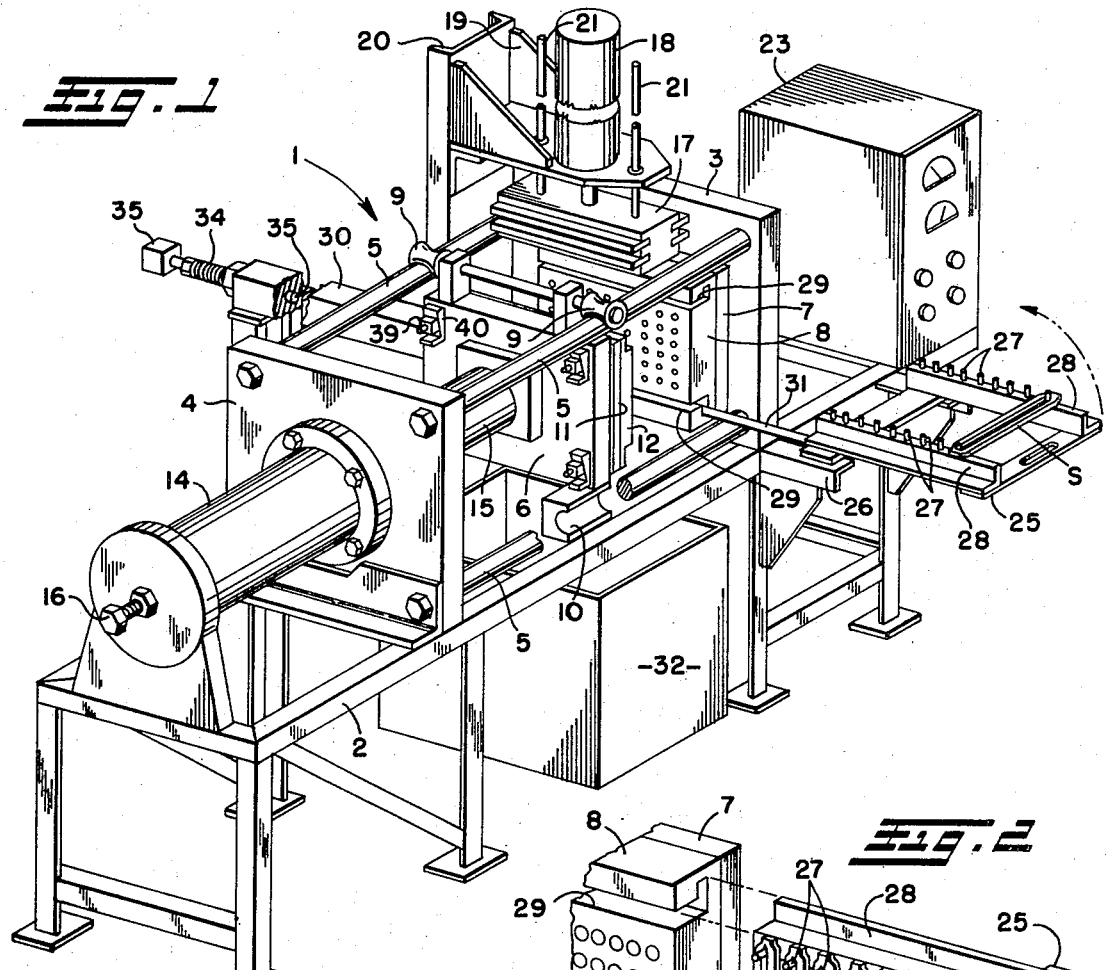
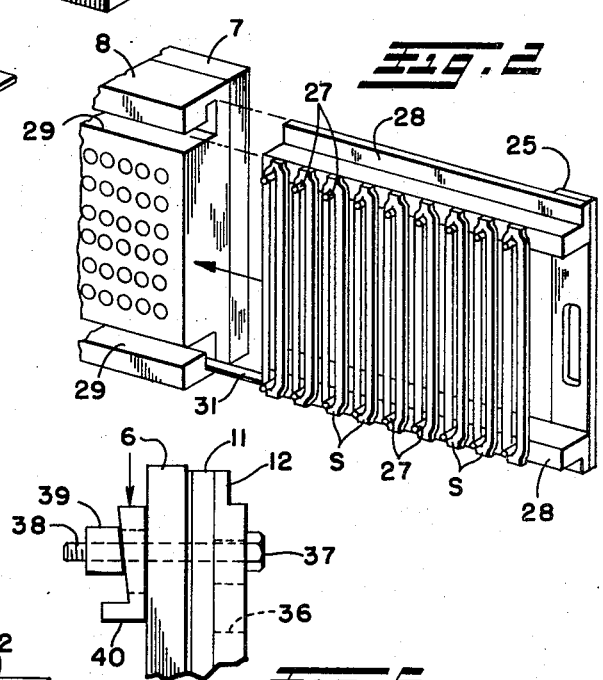
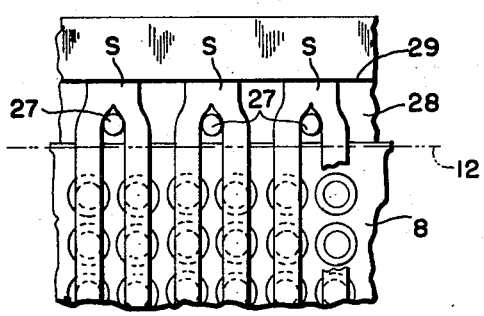
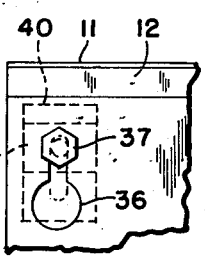
INVENTORS.
HARRY J. McCULLOUGH
JOHN SHAHID
ALAND BOYD
BY Oberlin, Maky, Donnelly & Renner
ATTORNEYS

VERTICAL MOLD PRESS FOR MOLDING ARTICLES OF RUBBER-LIKE MATERIAL

BACKGROUND OF THE INVENTION

It is known in the art of molding articles such as O-rings from rubber-like material to insert one or more molds between relatively vertically movably mounted press heads which have heating platens thereon, said molds generally comprising hinged together top and bottom mold plates between which uncured sheet or ring stock is loaded. In such presses when the curing cycle has been concluded the press heads are separated and the molds are bodily removed from the press and opened to strip the molded articles therefrom followed by placement of uncured sheet or ring stock on the bottom mold plates. The molds are then closed and reinserted between the press heads to cure the stock in the mold cavities under heat and pressure. As apparent, when the molds are withdrawn from between the heating platens there is opportunity for cooling thereof, whereby after the molds have been stripped, reloaded, closed, and reinserted in the press, the molds must be reheated to effect proper curing of articles therein.

It has also been proposed heretofore to provide a press having duplicate top mold plates in which the molded articles remain after the curing cycle. In such press when it is opened, one top plate with the molded articles therein is withdrawn horizontally and swung up to a vertical position and thence moved to the side. Uncured stock is then placed on the exposed bottom mold plate and the other top mold plate is inserted into the press, the press then being closed, and while closed, the molded articles are stripped from said one top mold plate. It is also known to provide such press in which the bottom mold plate with molded articles therein is withdrawn and inverted for stripping of the molded articles therefrom followed by turning it back to its normal position for loading of stock thereon and for reinsertion beneath a complemental top mold plate. Here again, the removed mold plate has opportunity to cool and must be reheated to curing temperature.

SUMMARY OF THE INVENTION

In contradistinction to known presses for molding articles of rubber-like material, the press constituting the present invention has vertically disposed mold plates which are secured to vertical heating platens and which, when the press is open, facilitates stripping of molded articles therefrom by gravity upon movement of a stripper downwardly between the separated mold plates.

The press herein is further characterized in that it has a loading device which while the press is closed during the curing cycle is disposed in a horizontal position to facilitate loading of uncured stock thereon, such stock preferably being in the form of slit strips of uncured rubber-like material which are stretched over pairs of vertical pins on the horizontally disposed loading device. When the press is opened and after stripping of the cured articles from the separated mold plates, the loaded loading device is moved to a vertical position and is thence slid laterally along guides of the fixed mold plate to position the uncured stock directly in front of the cavities in the latter, the loader pins being disposed above and below the upper and lower edges of the mold plates. When the press is closed, the stock is squeezed between the mold plates and is pinched off at the upper and lower edges of the mold plates so that the loading device may be withdrawn and moved to horizontal position for removal of the pinched off stock from the pins for re-use and for loading with slit strips as aforesaid.

The press herein is further characterized in the provision of novel lock means for releasably locking one mold plate (or both) to the press, said lock means preferably comprising wedge blocks which are driven downwardly as by hammer blows to lock the mold plate to the press and which are driven upwardly and turned 180° to invert them so that they will remain by gravity in mold plate releasing condition to facilitate removal of the mold plate for servicing or replacement.

Other objects and advantages of the present invention will appear hereinafter.

BRIEF DESCRIPTION OF THE DRAWING

FIG. 1 is a perspective view of a press embodying the present invention;

FIG. 2 is a fragmentary perspective view showing the loading device ready for lateral movement with respect to the fixed mold plate to position the strips of uncured stock on said loading device directly in front of and in register with the cavities of said fixed mold plate;

FIG. 3 is a fragmentary elevation view showing the uncured stock on the loading device in register with the mold cavities of the fixed mold plate;

FIG. 4 is a fragmentary side elevation view showing the movable mold plate lock means in releasing position whereat the mold plate may be readily removed or installed;

FIG. 5 is a fragmentary elevation view as viewed along the line 5—5, FIG. 4; and FIG. 6 is a fragmentary side elevation view similar to FIG. 4 except illustrating the mold plate lock means in locking position.

DETAILED DESCRIPTION OF THE INVENTION

As best shown in FIG. 1, the press 1 herein comprises a base framework 2 as of angle iron to which is secured heavy vertical plates 3 and 4 with tie bars 5 extending therebetween to form a rigid box-like structure holding the plates 3 and 4 parallel to each other with the bars 5 constituting guides for the movable press head 6. The plate 3 constitutes the fixed head of the press to which is bolted or otherwise secured a heating platen 7 and a mold plate 8. The movable head 6 of the press is longitudinally movably guided along the bars 5 by concave rollers 9 and by longitudinally extending guide shoes 10 for movement toward and away from the fixed head 3, said movable head 6 having secured thereto a heating platen 11 and a mold plate 12. Said mold plates 8 and 12, when engaged with each other, define mold cavities conforming to the articles to be molded. By way of example, the cavities herein are O-ring cavities arranged in horizontal and vertical rows as shown, and the fixed mold plate 8 will be provided with further recesses or cavities within the respective O-ring cavities to accommodate excess material.

The end plate 4 has secured thereto a hydraulic cylinder 14, the piston rod 15 of which is connected to the center of the movable press head 6 and adjustable stop means 16 in the cylinder 14 is engaged by the piston therein to determine the amount of opening movement of the press so that the distance between the mold plates 8 and 12 is slightly less than the width of the stripper 17 which has opposite pairs of stripper blades of rubber-like material to strip molded articles from the mold plates 8 and 12 when the stripper 17 is moved downwardly between said mold plates 8 and 12 as by means of an actuating cylinder 18 mounted on the bracket 19 of the upright frame member 20. By reason of the provision of the excess material cavities in the fixed mold plate 8, the molded articles will generally remain stuck there. Movement of the stripper 17 downwardly and upwardly is guided as by means of the guide rods 21 thereon engaged in guide holes in the bracket 19.

The platens 7 and 11 may be heated by any well known means such as electrical heating elements (not shown) and at the end of the framework 2 remote from the press actuating cylinder 14 there may be provided a control unit 23 which, if desired, may contain an electric motor driven hydraulic pump and solenoid operated four-way valves which control the direction of actuation of the respective cylinders 14 and 18. The control unit 23 may also be provided with an adjustable timer to retain the press in closed position for the required curing time of the molded articles, temperature control means for adjusting the platen and mold plate temperatures, and such other controls as are generally employed with molding presses for molding rubber-like articles.

A loading device 25 is supported on the shelf 26 of the framework 2 in a horizontal position as shown in FIG. 1 so that slit strips S of uncured rubber-like material may be stretched over the upstanding pins 27 of said loading device 25. The side rails 28 of the loading device 25 are of L-shaped cross-section complemental with the L-shaped slots 29 through the fixed mold plate 8, the loading device 25 being supported for rotation from the horizontal position of FIG. 1 to the vertical position of FIG. 2 and for sliding laterally of the mold plate 8 with the rails 28 slidably engaged in the guide slots 29 by means of the elongated guide member 30 in which the support bar 31 of the loading device 25 is rotatable and longitudinally slidable.

When the press is open as in FIG. 1, the loading device 25 with the strips S mounted on pins 27 is swung from the horizontal position shown in FIG. 1 to the vertical position shown in FIG. 2, whereupon the loading device 25 is moved horizontally toward the fixed mold plate 8 with the L-shaped rails 28 engaged in the L-shaped guide slots 29 of the mold plate 8 thus to position the strips S in close proximity to the face of mold plate 8 with the opposite sides of each strip S aligned with the respective vertical rows of cavities as shown in FIG. 3. The volume of uncured stock exceeds the aggregate volume of the cavities defined when the mold plates 8 and 12 are in mating engagement. With the loading device 25 positioned as shown in FIG. 3, the press actuating cylinder 14 may be actuated toward the right as viewed in FIG. 1, to squeeze the uncured stock strips S between the mold plates 8 and 12 in accurate registry with the cavities and to bite off the portions of the strips S beyond the upper and lower edges of the mold plates 8 and 12 so that the loading device 25 may be withdrawn together with the remaining bit-off pieces of stock S and swung to the FIG. 1 position. After such pieces have been removed from the pins 27, the loading device 25 may be reloaded with uncured stock strips S during the time that the stock in the mold cavities is being cured under pressure and heat.

After a predetermined curing time which may be set by an adjustable timer not shown, a four-way solenoid valve for the press actuating cylinder will be energized to admit fluid under pressure into the rod end of the cylinder 14 thus to move the head 6 to the left as viewed in FIG. 1, to an open position and if desired, at the time the adjustable stop 16 is engaged by the piston in cylinder 14 a limit switch may be tripped to energize a four-way solenoid valve to cause the stripper actuating cylinder 18 to move the stripper 17 down for stripping the molded articles from the mold plates 8 and 12 for gravity discharge into a suitable receptacle 32 positioned beneath the mold plates 8 and 12. When the stripper 17 reaches the lower end of its stroke, a limit switch may be tripped thereby to reverse the solenoid valve therefor to move the stripper 17 to its upper retracted position as shown in FIG. 1.

The loader guide 30 may be provided with an adjustable stop 34 and limit switch 35 which, when the loading device 25 is in proper position with the uncured stock strips S properly aligned with the cavities of the mold plates 8 and 12 the solenoid valve for the cylinder 14 will be energized to move the press head 6 to closed position to grip the stock S between the mold plates 8 and 12 and to apply pressure thereon to cause it to flow into the mold cavities where it is cured under heat and pressure.

In order to facilitate mold plate removal and assembly and mold plate alignment, the mold plate 12 is provided with keyhole slots 36 to fit over the bolt heads 37 as shown in FIGS. 4 and 5, the bolts 38 extending through holes in the heating platen 11 and having screwed thereon nuts 39 having inclined inner faces which cooperate with inclined faces of the wedge blocks 40. When the mold locking mechanisms are in the position shown in FIGS. 4 and 5 the mold plate 12 may be lifted and withdrawn away from the heating platen 11 and replaced by another mold plate having a like keyhole slot 36 construction at its four corners, the new mold plate being moved to the left as viewed in FIG. 4 and thence downwardly whereby the new mold plate is supported in approximately aligned position with the fixed mold plate 8.

With the mold plate 12 thus suspended by the bolts 38, the cylinder 14 may be actuated with low pressure to move the mold plate 12 into contact with the fixed mold plate 8 and in this condition the mold plate 12 may be shifted upward or sideward or tilted so as to be in perfect alignment with the fixed mold plate 8. With the mold plate thus held by friction in aligned position, the wedge blocks 40 may be turned 180° to the FIG. 6 position and then struck downwardly as with a hammer to the locking position to secure tight clamping of the mold plate 12 to the platen 11.

When it is desired to replace the mold plate 12 it is a simple matter to hit the wedge blocks 40 upwardly to loosen the mold plate 12 and then to turn the wedge blocks 40 back to the FIG. 4 position in which they hang by gravity to permit removal of the mold plate 12 by lifting and axial movement.

The ends of the strips S which are bitten off during the press closing operation may be saved and reprocessed to make new slit strips S. Of course, when the uncured stock S is squeezed between the mold plates 8 and 12 the adjoining strips S may be joined together as flash and therefore the vertical rows of molded articles may be tied together as a single sheet and will be stripped in that form into the receptacle 32.

As aforesaid, the stock supporting pins 27 will be spaced apart somewhat more than the length of the slit in each strip S so that in loading the loading device 25 the stock S will be stretched straight between the respective pairs of pins 27 in predetermined spaced apart relation as determined by the diameters of the pins 25, so as to align the sides of the strips S with the respective vertical rows of cavities. The use of the press 1 herein for molding O-rings or the like is to be considered merely exemplary and it is apparent that the molded article or articles may be of any desired shape just so long as the volume of the uncured stock exceeds the volume of the cavity or cavities defined between the mating mold plates 8 and 12 to insure complete filling of the cavity or cavities.

We, therefore, particularly point out and distinctly claim as our invention:

1. In a press of the type having relatively movable press heads with mold plates thereon which, when the press is closed, are in mating engagement to define therebetween a mold cavity in which an article of rubber-like material is adapted to be formed and which, when the press is open, are separated for removal of the molded article from therebetween, the improvement which comprises a loading device having means to support molding stock thereon; guide means on said press to guide said loading device for lateral movement into and out of the press respectively to position the molding stock thereon between said mold plates when the press is open for squeezing of the stock into such cavity as the press is closed and to withdraw said loading device for reloading with molding stock while the press is closed.

2. The press of claim 1 wherein stripping means is supported by said press for lateral movement into and out of the open press to engage the molded article to strip it from a mold plate in which it may be stuck.

3. The press of claim 1 wherein said loading device supports the molding stock in close proximity to the molding face of one of said mold plates and beyond the opposite edges of the molding faces of said mold plates whereby the molding stock is retained in predetermined position relative to the mold cavity as the press is closed until the edges of said molding faces pinch off the molding stock therebeyond.

4. The press of claim 1 wherein said press heads include heating platens to which said mold plates are secured to cure a rubber-like article under heat and pressure when the press is closed.

5. The press of claim 1 wherein said press heads and mold plates are vertically disposed for relative horizontal movement; wherein said loading device supports the molding stock in vertical position; and wherein said guide means supports said loading device for horizontal lateral movement in a vertical plane to position the molding stock vertically between said mold plates when the press is open.

6. The press of claim 5 wherein said loading device, when withdrawn from said press, is supported by the latter for movement to a horizontal position to facilitate loading of molding stock thereonto in horizontal position while the press is closed.

7. The press of claim 5 wherein said mold cavity comprises a plurality of cavities arranged in vertical rows; and wherein said stock support means of said loading device comprises upper and lower rows of transversely projecting pins over which slit strips of molding stock are positioned, said strips of molding stock registering with said vertical rows of cavities when said loading device is moved into said press.

8. The press of claim 7 wherein said upper and lower rows of pins are disposed above and below the upper and lower edges of the molding faces of said mold plates and are located to position the strips of molding stock thereon in close proximity to the molding face of one of said mold plates whereby said molding strips are held in position during the closing of the press and until the portions of the strips above and below the molding faces is pinched off upon closing of the press whereafter the loading device may be withdrawn from the press for removal of the pinched off portions of the strips from said pins and for reloading of molding stock strips onto said pins as aforesaid while the press is closed.

9. The press of claim 8 wherein said loading device, when withdrawn from the press, is supported by the press for movement to a horizontal position with said rows of pins extending upwardly to facilitate loading molding stock strips thereonto in horizontal position.

10. The press of claim 9 wherein said rows of pins are spaced apart a distance exceeding the length of the slits in said molding stock strips whereby the latter are stretched over said pins to maintain them in a plane parallel to the molding faces of said mold plates when said loading device is moved back to vertical position preparatory to movement into the open press.

11. The press of claim 5 wherein stripping means is supported by said press for vertical movement into and out of the open press to engage the molded article during downward movement of said stripping means to strip the article from a mold plate in which it may be stuck for gravity discharge from between the separated mold plates.

12. The press of claim 1 wherein one mold plate is secured to the respective press head by releasable lock means which includes a bolt and nut means and a wedge block between said press head and said nut means which is adapted to be driven in opposite directions laterally of said bolt means to lock and unlock said mold plate to or from said press head.

13. The press of claim 12 wherein said wedge block has en elongated slot through which said bolt means passes, said mold plate and press head being disposed in vertical position with said bolt and nut means disposed horizontally whereby said wedge block is adapted to be driven downwardly to locking position and upwardly to unlocking position, said wedge block, when in unlocking position, being turned 180° to retain it by gravity in such unlocking position.

14. The press of claim 13 wherein said mold plate has a keyhole slot therethrough through the wide portion of which the head of said bolt passes whereby, when said lock means is in unlocking position, said mold plate may be raised to position the large portion of the keyhole slot in registry with said bolt head for horizontal withdrawal movement of the mold plate with respect to said press head.

* * * * *